(12) United States Patent
Schleicher, Jr.

(10) Patent No.: US 9,925,699 B2
(45) Date of Patent: Mar. 27, 2018

(54) PRINTABLE MAGNETIC RECEPTIVE COMPOSITE SHEET AND METHOD OF MAKING

(71) Applicant: John E. Schleicher, Jr., Rockaway, NJ (US)

(72) Inventor: John E. Schleicher, Jr., Rockaway, NJ (US)

(73) Assignee: Schleicher Enterprises, LLC, Treasure Island, FL (US)

( * ) Notice: Subject to any disclaimer, the term of this patent is extended or adjusted under 35 U.S.C. 154(b) by 0 days.

(21) Appl. No.: 15/148,799

(22) Filed: May 6, 2016

(65) Prior Publication Data

US 2016/0250783 A1    Sep. 1, 2016

Related U.S. Application Data

(60) Division of application No. 14/546,751, filed on Nov. 18, 2014, now Pat. No. 9,346,307, which is a
(Continued)

(51) Int. Cl.
*B29C 43/24* (2006.01)
*B41M 5/50* (2006.01)
(Continued)

(52) U.S. Cl.
CPC ............ *B29C 43/24* (2013.01); *B29C 43/28* (2013.01); *B29C 65/4805* (2013.01); *B29C 66/7485* (2013.01); *B29C 66/7486* (2013.01); *B32B 37/156* (2013.01); *B41M 5/504* (2013.01); *B41M 5/508* (2013.01); *H01F 1/0027* (2013.01); *H01F 41/16* (2013.01); *B29C 43/003* (2013.01); *B29C 43/265* (2013.01);
(Continued)

(58) Field of Classification Search
CPC ............................. B29C 43/24; B29C 43/003
See application file for complete search history.

(56) References Cited

U.S. PATENT DOCUMENTS 4,889,765 A * 12/1989 Wallace ................... B41M 5/52
427/407.1
5,609,788 A    3/1997 Deetz
(Continued)

FOREIGN PATENT DOCUMENTS

DE    19739174 A1    3/1999
EP    1360071 B1    1/2006
(Continued)

OTHER PUBLICATIONS

International Search Report and Written Opinion of International Patent Application No. PCT/US2014/067210 filed Nov. 25, 2014, 11 pages.
(Continued)

*Primary Examiner* — Michael N Orlando
*Assistant Examiner* — Cynthia L Schaller
(74) *Attorney, Agent, or Firm* — Wood Herron & Evans LLP

(57) ABSTRACT

Printable magnetic receptive composite sheets are made by calendering a thin layer of a magnetic composition and bonding it to a top printable layer on one or both sides of the magnetic layer wherein the calendered layer has a thickness up to 10 mils.

10 Claims, 2 Drawing Sheets

Related U.S. Application Data continuation-in-part of application No. 14/092,231, filed on Nov. 27, 2013, now abandoned.

(51) Int. Cl.

| | | |
|---|---|---|
| *B32B 37/00* | (2006.01) | |
| *B29C 65/48* | (2006.01) | |
| *B29C 65/00* | (2006.01) | |
| *H01F 1/00* | (2006.01) | |
| *H01F 41/16* | (2006.01) | |
| *B29C 43/28* | (2006.01) | |
| *B41M 5/52* | (2006.01) | |
| *B29C 43/00* | (2006.01) | |
| *B29K 101/12* | (2006.01) | |
| *B29K 105/16* | (2006.01) | |
| *B29C 43/26* | (2006.01) | |

(52) U.S. Cl.
CPC ...... *B29K 2101/12* (2013.01); *B29K 2105/16* (2013.01); *B29K 2995/0008* (2013.01); *B32B 2307/208* (2013.01); *B32B 2307/75* (2013.01); *B41M 5/5218* (2013.01); *B41M 5/5254* (2013.01); *B41M 5/5281* (2013.01); *Y10T 156/1039* (2015.01); *Y10T 428/269* (2015.01)

(56) References Cited

U.S. PATENT DOCUMENTS

| | | | |
|---|---|---|---|
| 5,843,329 A | 12/1998 | Deetz | |
| 6,262,174 B1 * | 7/2001 | Cooper | C08L 23/04 428/461 |
| 6,436,520 B1 | 8/2002 | Yamamoto | |
| 7,128,798 B2 | 10/2006 | Boudouris et al. | |
| 7,338,573 B2 * | 3/2008 | Boudouris | B32B 27/18 156/244.11 |
| 7,956,101 B2 | 6/2011 | Grossman | |
| 8,440,128 B2 * | 5/2013 | Love | H01F 1/117 264/108 |
| 8,487,018 B2 | 7/2013 | Grossman | |
| 2003/0034869 A1 | 2/2003 | Matsumura et al. | |
| 2004/0009370 A1 | 1/2004 | Abe | |
| 2012/0135175 A1 | 5/2012 | Servida et al. | |
| 2013/0130000 A1 | 5/2013 | Deetz | |
| 2013/0323475 A1 * | 12/2013 | Lefevre | B42D 15/02 428/195.1 |
| 2015/0069650 A1 * | 3/2015 | Boudouris | B32B 27/308 264/132 |

FOREIGN PATENT DOCUMENTS

| | | |
|---|---|---|
| JP | 2000025330 A | 1/2000 |
| JP | 2006272639 A | 10/2006 |
| WO | 2004036606 A1 | 4/2004 |
| WO | 2012149476 A2 | 11/2012 |
| WO | 2013086690 A1 | 6/2013 |
| WO | 2015081036 A2 | 6/2015 |

OTHER PUBLICATIONS

European Patent Office, Supplementary European Search Report issued in application No. EP 14 86 6460, dated Jan. 31, 2017, 10 pages.

* cited by examiner

PRINTABLE MAGNETIC RECEPTIVE COMPOSITE SHEET AND METHOD OF MAKING

CROSS REFERENCE TO RELATED APPLICATIONS

This application is a divisional application of U.S. patent application Ser. No. 14/546,751 filed Nov. 18, 2014, entitled A PRINTABLE MAGNETIC RECEPTIVE COMPOSITE SHEET AND METHOD OF MAKING which is a continuation-in-part application of U.S. patent application Ser. No. 14/092,231 filed Nov. 27, 2013, entitled A PRINTABLE MAGNETIC RECEPTIVE COMPOSITE SHEET AND METHOD OF MAKING.

FIELD OF THE INVENTION

Printable magnetic receptive composite sheets are disclosed. These composite sheets are made by calendering thin layers of magnetic compositions and bonding to a top printable layer wherein the calendered layer has a thickness up to 10 mils.

BACKGROUND OF THE INVENTION

Magnetic printable assemblies that will self-adhere to a magnetically attractable surface are well known. Flexible materials in the form of sheets or rolls have been commercially available and are typically prepared by mixing a powdered ferrite material with a suitable polymeric or plastic binder into a uniform mixture and then extruding or calendering them into sheets or films. The magnetic material may then be permanently magnetized and the resulting pieces may then be placed on a magnetically attracted surface where they are often used in conveying information. Examples of prior art patents in this field include U.S. Pat. Nos. 7,128,798; 7,338,573; 5,843,329; 5,609,788 and the patents cited in these patents as representative of the prior art. Efforts have been made to produce relatively thin printable magnetic receptive films or sheets. However, no known methods are believed to allow for acceptable products having relatively thin layers of the binder/magnetic material mixture less than 10 mils.

SUMMARY OF THE INVENTION

This invention is directed to a printable magnetic receptive composite sheet having multiple layers. The sheet or film comprises a calendered magnetic layer of a thermoplastic binder and a magnetic material and a top printable layer bonded to the calendered layer, wherein the calendered magnetic layer has a thickness up to 10 mils. Another embodiment of the printable magnetic receptive composite of this invention has both a top printable layer and a bottom printable layer, or in other words, the composite has the additional feature of being printable on both sides. Printable magnetic receptive sheets are provided that are flexible, readily printable and employed for securement to a magnetically attracted surface. The thin printable magnetic sheets or films have outer surfaces that may be printed with a decorative pattern and/or promotional information. Therefore, they serve a very useful function in easily conveying information and/or promotional material on a variety of surfaces.

The printable magnetic receptive composites of this invention are several times more effective in magnetic capacity than presently available magnetic assemblies. This property is attributable to the method of making and assembly of the components in the printable magnetic receptive composite.

The amount of magnetic material in the composite magnetic layer is on the order of about 50% by wt. with the balance being about 50% by wt. of thermoplastic binder. More generally, a range of about 50% to 60% by wt. of magnetic material and 60% to 40% by wt. of thermoplastic binder is suitable.

The printable composite is of indefinite length and widths of up to about 60 inches are obtainable with the relatively thin flexible construction of magnetic composite total layers up to 20 mils.

An additional unique feature of the inventive printable magnetic receptive composite is the inclusion of a prodegradant additive in the magnetic thermoplastic binder and magnetic material layer composition to enhance the compatibility of the components, and yet facilitate the biodegradability of the composite. Thus, the magnetic receptive composite of the invention is especially adapted to be compostable in municipal solid waste composting facilities such that it may be degraded by physical, chemical, thermal and/or biological degradation. Therefore, after its usage as a composite to convey decorative patterns and/or other information by attachment of the magnets to a variety of surfaces, the composite may be disposed of by degradation in a municipal solid waste composting facility.

The printable magnetic receptive composite of this invention, its method of manufacture and compostability would be further understood with reference to the following detailed description.

DETAILED DESCRIPTION OF THE INVENTION

The printable magnetic receptive composite comprises a calendered magnetic layer of a thermoplastic binder and a magnetic material, typically a ferrous alloy powder. A printable top layer is bonded to the calendered layer, wherein the calendered magnetic layer has a thickness up to 10 mils. In an alternative embodiment, a printable layer is bonded to the calendered layer on both sides of the calendered layer. In this embodiment, therefore printable surfaces are available on both sides of the magnetic receptive composite. In either embodiment, the thickness of the calendered magnetic layer is relatively thin and is on the order of about 6 to 10 mils. Thin, flexible composites are provided without pinholes or voids. A printable layer usually has a thickness of up to about 6 mils, resulting in an overall dimensional thickness of about 10 to 20 mils for the composite. Other features of this invention would be better understood with reference to the following drawings and description.

THERMOPLASTIC BINDER

Figure 1:
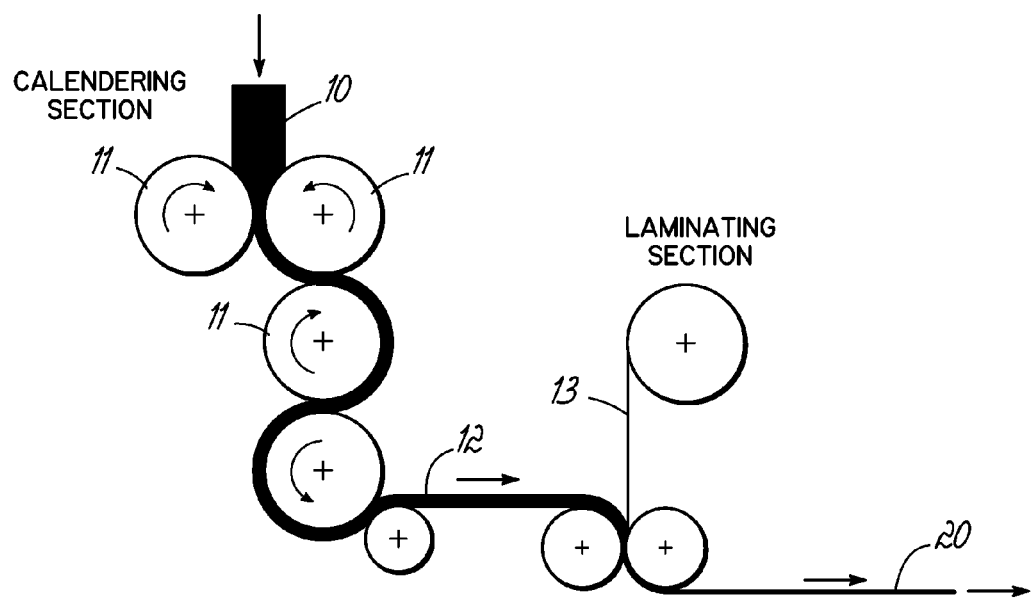
FIG. 1 is a schematic of an in-line calendering and lamination apparatus for making a printable magnetic receptive composite of this invention having a printable substrate on one side of the composite.

The thermoplastic binder for the magnetic material employed in making a printable magnetic receptive composite may be selected from the classes of olefin polymer, vinyl halide polymer and vinyl acetate polymer as defined as follows.

A. Olefin Polymer

The olefin polymer employed is most commonly a homopolymer, copolymer, or terpolymer of monomers such as ethylene, propylene or a diene. The principles of this invention are applicable to polymers of unsaturated hydrocarbons containing one or more pairs of carbon atoms linked by a double bond. While this invention has been illustrated with specific olefin polymers in the operating examples which follow, it is to be understood that this invention is not limited to the specific examples. The olefin monomers that may be polymerized alone or in admixture with other ethylenically unsaturated monomers include, e.g., ethylene; propylene; 1-butene; isobutene; 1-pentene; vinyl benzenes and naphthalenes such as styrene or vinyl naphthalene; and dienes such as butadiene, isoprene, cyclopentadiene, and ethylidene norbornene (ENB). Copolymers of such monomers include acrylonitrile-butadiene-styrene (ABS) and styrene-acrylonitrile (SAN). Suitable elastomeric polymers may also be biodegradable. Suitable elastomeric polymers include terpolymers of ethylene, propylene, and a diene, such as ENB (EPDM). Other elastomers include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ethylene-propylene-diene), and ethylene-propylene. A new class of rubber-like polymers may also be employed and they are generally referred to as polyolefins produced from single-site or metallocene catalysts whereby ethylene, propylene, styrene and other olefins may be polymerized with butene, hexene, octene, etc., to provide elastomers suitable for use in accordance with the principles of this invention, such as poly(ethylene-butene), poly(ethylene-hexene), poly(ethylene-octene), poly(ethylene-propylene) and/or polyolefin terpolymers thereof.

B. Vinyl Halide Polymer

The vinyl halide resin employed is most commonly a homopolymer of vinyl chloride, i.e., polyvinyl chloride. It is to be understood, however, that this invention is not limited to a particular vinyl halide resin such as polyvinyl chloride (PVC) or its copolymers. Other halogen-containing polymers or resins which are employed and which illustrate the principles of this invention include chlorinated polyethylene, chlorosulfonated polyethylene, chlorinated polyvinyl chloride, and other vinyl halide polymer or resin types. Vinyl halide polymer or resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C=CHCl$ to polyvinyl chloride $(CH_2CHCl-)n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinate polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

C. Vinyl Acetate Polymer

The vinyl acetate polymer employed is most commonly a homopolymer of vinyl acetate, i.e., polyvinyl acetate. Copolymers of vinyl acetate are also suitably employed. It is to be understood, however, that this invention is not limited to polyvinyl acetate or its copolymers. Other vinyl acetate based polymers which are employed and which illustrate the principles of this invention include partially hydrolyzed polyvinyl acetate, e.g. polyvinyl alcohol, ethylene-vinyl acetate, vinyl chloride-vinyl acetate copolymer or other copolymer types. Vinyl acetate based polymer, as understood herein, and as appreciated in the art, is a common term and is adopted to define those polymers usually derived by polymerization or copolymerization of vinyl acetate monomer with or without other comonomers such as ethylene, propylene, vinyl chloride, vinyl ethers, vinylidene chloride, methacrylate, acrylates, styrene, etc. A simple case is the conversion of vinyl acetate to polyvinyl acetate wherein the ether oxygen of the ester group is bonded to the carbon atoms of the carbon chain of the polymer.

Magnetic Material

The term "magnetic material" refers to any material which exhibits permanent magnetic behavior or is readily permanently magnetized. Typically, a magnetic powder is particularly suitable for use including the ferrites and other examples that are well known in the art. Specifically, the following Table describes a suitable ferrous alloy powder that is employed.

TABLE

| Compound | Compound Name | Conc (wt %) | Element | Conc (wt %) |
|---|---|---|---|---|
| Fe2O3 | Iron (III) oxide | 82 | Fe | 57 |
| MnO | Manganese (II) Oxide | 13 | Mn | 10 |
| ZnO | Zinc Oxide | 4.2 | Zn | 3.3 |
| SiO2 | Silicon dioxide | 0.34 | Si | 0.16 |
| Na2O | Sodium Oxide | 0.32 | Na | 0.24 |
| SrO | Strontium oxide | 0.13 | Sr | 0.11 |
| Al2O3 | Aluminum oxide | 0.11 | Al | 0.057 |
| ZrO2 | Zirconium dioxide | 0.1 | Zr | 0.078 |
| CaO | Calcium Oxide | 0.1 | Ca | 0.072 |
| P2O5 | Phosphorus pentoxide | 0.06 | P | 0.026 |
| TiO2 | Titanium dioxide | 0.059 | Ti | 0.035 |
| MgO | Magnesium Oxide | 0.05 | Mg | 0.03 |
| SO3 | Sulfur Triooxide | 0.042 | S | 0.017 |
| Cr2O3 | Chromium (III) oxide | 0.032 | Cr | 0.022 |
| V2O5 | Vandium (V) oxide | 0.029 | V | 0.016 |
| Cl | Chloride | 0.019 | Cl | 0.019 |
| Nb2O5 | Niobium pentoxide | 0.015 | Nb | 0.01 |
| | | 100.606 | | |

Auxiliary Agent or Compatibilizer

An auxiliary agent or compatibilizer, used to facilitate the blending of the magnetic material in the thermoplastic binder, includes, for example, an ethylene vinyl acetate (EVA) and a polyolefin elastomer of the type defined above. A compatibilizing prodegradant additive such as an organotitanate or zirconate may be employed as coupling agents in binder compositions to essentially increase the stability of the polymeric compositions. These additives may be used to couple the thermoplastic binder with the magnetic powder in the composition. In addition, these organotitanates or zirconates have been found, according to U.S. Pat. No. 7,956,101 to act as anaerobic prodegradants thereby achieving a further objective of the composite of this invention by rendering the useful printable magnetic receptive composites anaerobically degradable in landfills. The entire disclosure of U.S. Pat. No. 7,956,101 is incorporated herein by reference to describe these additives and polymer binder compositions for use in the magnetic receptive composites of this invention.

Example 1

Figure 2:
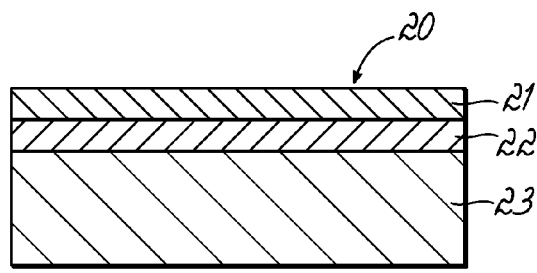
FIG. 2 is a magnified diagrammatic sketch and cross section of the printable magnetic receptive composite after lamination.

With reference to the drawings FIGS. 1 & 2, a chlorinated polyethylene polymer is blended with an auxiliary agent such as EVA and polyolefin elastomer along with the ferrous alloy powder as defined above. The ferrous powder is manufactured by BGRIMM Materials & Technology Co., Ltd. in China. The percentages in the mixture of the composition include about 30% polyethylene, about 50% ferrous alloy powder and about 20% auxiliary agents, such as, the combination of EVA and polyolefin elastomer.

With reference to FIG. 1, the composition is calendered by passing the polymer binder/magnetic material blend as a continuous sheet 10 through a number of pairs of heated rollers 11 shown diagrammatically in FIG. 1. Roller temperatures typically range from about 165° C. to 180° C. during calendering. The resulting flexible calendered sheet 12 is then laminated to a printable substrate 13 in-line as shown in FIG. 1 to form the magnetic composite sheet 20 of FIG. 2. The lamination can occur in different ways. One way is to bond the printable substrate 13 at suitable temperature and then cooling the substrate. Another method is to use an adhesive such as a water-based polyurethane adhesive or EVA adhesive to bond the printable substrate 13 to the cooled sheet 12. Either of these methods is acceptable and, in this example, the composite 20 of FIG. 1 is a polyethylene terephthalate (PET) film 22 having a universal coating 21 for solvent, eco-solvent, latex, UV or epoxy ink printing with magnetic receptive layer 23. The printable coating contains either a silicone dioxide or a titanium oxide pigment, dispersed in a polymeric binder of water-based polyurethane, water-based EVA, or polyacrylic emulsion, thereby rendering the printable surface of the PET film 22 white. The thickness of the universal coating 21 may vary, but is on the order of 1 mil. The thickness of the printable layer is on the order of 1 to 6 mil(s), but may vary. The thickness of the calendered magnetic layer is up to 10 mils, normally 6 to 10 mils. Accordingly, a flexible printable magnetic receptive film 20 with the multiple layers having an overall or total thickness up to about 20 mils, preferably 12 mils, is obtained.

Example 2

Figure 3:
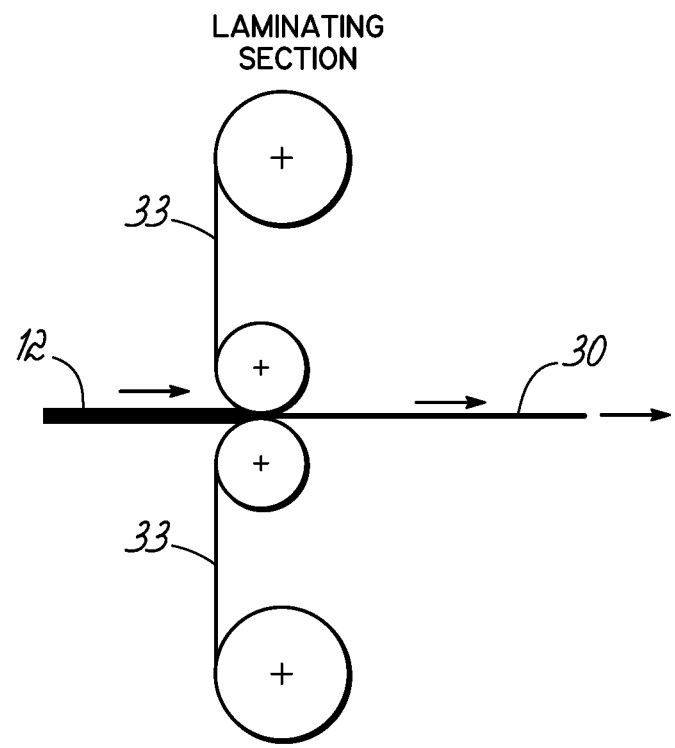
FIG. 3 is a schematic of an alternative laminating section for the calendering and lamination apparatus of FIG. 1 for making a printable magnetic receptive composite of this invention having a printable substrate on both sides of the composite.
Figure 4:
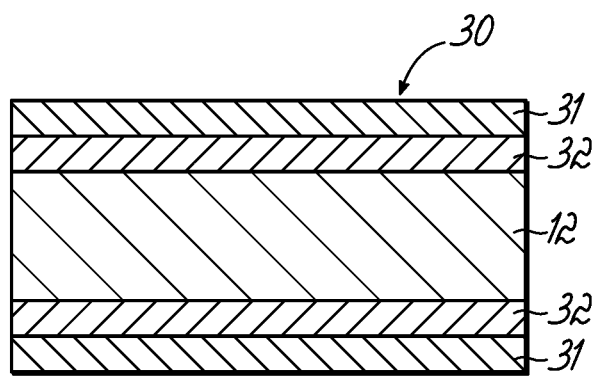
FIG. 4 is a magnified diagrammatic sketch and cross section of the printable magnetic receptive composite after lamination with the alternative laminating section of FIG. 3.

With reference to the drawings FIGS. 3 & 4, an alternative laminating section is illustrated for producing the printable magnetic receptive composite 30 having printable surfaces 31, 31 on both sides of the composite. The composition of Example 1 of polymer binder/magnetic material blend is passed as a continuous sheet 10 through a number of pairs of rollers 11 shown diagrammatically in FIG. 1. Suitable roller temperatures typically range from 165° C. to 180° C. during calendering. The resulting flexible calendered sheet 12 is then laminated on both sides to a printable substrate 33 as shown in the alternative laminating section of FIG. 3 to form a magnetic composite sheet 30 of FIG. 4. Lamination can occur in different ways as described above in Example 1 with references to FIGS. 1 &2, however in this example, the magnetic composite sheet 30 of FIG. 4 has a printable surface layer on the top 31 and bottom 31, or both sides, of the composite 30.

One specific example of a dual printable magnetic composite 30 has a PET film 32 with a printable white surface 31, that contains either a silicon dioxide or titanium oxide pigment on both sides of the magnetic layer 12. The thickness of the PET film 32 is about 0.06 mm (about 2.36 mils). The top printable layer 31 is about 0.08 mm (about 3.15 mils) in thickness. The bottom printable layer 31 including the magnetic layer 12 is about 0.27 mm (about 10.6 mils) in thickness. The film 32 of the bottom layer can be PVC instead of PET. Thus, a specific composite of this invention has an overall thickness of about 0.41 mm (about 16 mils) and an overall weight of about 740 gsm.

For comparison with this Example 2, a one-sided printable magnetic composite of this invention made in accordance with Example 1 has an overall thickness of 0.34 mm (about 13.4 mils) and a weight of about 610 gsm, where the total thickness of a composite is about 0.34 mm (about 13.4 mils) with a PET film thickness of about 0.06 mm (2.36 mils) a top printable film thickness of about 0.07 mm (about 2.76 mils) with a magnetic layer and bottom film having a thickness of about 0.21 mm (about 8.27 mils). This product of Example 1 has a white printable film surface with a gray film on the opposite surface attributable to the magnetic layer of the composite, whereas the two-sided printable film of this Example 2 has a white printable surface on both sides.

While the printable layer substrate is a polyethylene terephthalate or PVC film in the above examples, it is understood that the substrate for the printable layer is variable to include any polymeric material, cotton, textile, or paper products, and the like, that may suitably carry a universal coating for solvent, eco-solvent, latex, UV or epoxy type printing. In view of this description, other embodiments of this invention will become apparent to those skilled in the art.

What is claimed is:

1. A method of making a flexible printable magnetic receptive composite sheet having multiple layers with a front and a back side consisting of:
   blending a thermoplastic binder and a ferrous powder to provide a thermoplastic composition,
   forming the composition by passing the blend through heated rollers to form a continuous sheet of indefinite length,
   passing the continuous sheet of indefinite length through calender rollers,
   calendering the sheet of indefinite length of the thermoplastic composition into a continuous relatively thin magnetic receptive layer having a thickness on the order of about 6 to 10 mils and;
   laminating a printable top layer onto at least one of said magnetic receptive composite sheet sides, said printable top layer comprises a universal coating for solvent, eco-solvent, latex, UV or epoxy ink printing.

2. The method of claim 1 conducted at an elevated temperature for laminating the magnetic receptive layer to said printable top layer.

3. The method of claim 1 wherein the lamination is conducted with the aid of an adhesive selected from the group consisting of water-based polyurethane and water-based EVA.

4. The method of claim 1 wherein the said thermoplastic binder is a polymer selected from the monomeric group consisting of an olefin, vinyl halide and vinyl acetate, and copolymers thereof.

5. The method of claim 1 wherein said printable top layer is a substrate selected from the group consisting of a polymeric material, cotton, textile and a paper product.

6. The method of claim 1 wherein said printable coating has a silicon dioxide or a titanium oxide pigment dispersed in a polymeric binder selected from the group consisting of a water-based polyurethane, water-based ethylene vinyl acetate polymer and polyacrylic emulsion.

7. The method of claim 1 wherein said flexible composite sheet has an indefinite length and comprises a width of up to about 60 inches with total thickness of up to about 20 mils.

8. The method of claim 1 wherein said thermoplastic binder comprises a polyester or PVC.

9. The method of claim 8 wherein the polyester is polyethylene terephthalate.

10. The method of claim 1 wherein the amount of ferrous powder is about 50%-60% by weight and the amount of the thermoplastic binder is about 50%-40% by weight.

\* \* \* \* \*